(12) United States Patent
Mori et al.

(10) Patent No.: US 7,960,053 B2
(45) Date of Patent: Jun. 14, 2011

(54) SEALED BATTERY AND MANUFACTURING METHOD THEREFOR

(75) Inventors: Kazuteru Mori, Minamiawaji (JP); Hiroyuki Inoue, Minamiawaji (JP); Kazuki Shimozono, Sumoto (JP); Kazuo Tomimoto, Minamiawaji (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 983 days.

(21) Appl. No.: 11/184,828

(22) Filed: Jul. 20, 2005

(65) Prior Publication Data

US 2006/0019159 A1    Jan. 26, 2006

(30) Foreign Application Priority Data

Jul. 21, 2004   (JP) .................................. 2004-213566

(51) Int. Cl.
  *H01M 2/04*    (2006.01)
  *H01M 2/00*    (2006.01)
  *H01M 2/06*    (2006.01)
  *H01M 2/30*    (2006.01)
(52) U.S. Cl. ......... 429/163; 429/175; 429/178; 429/171
(58) Field of Classification Search .................. 429/176, 429/178, 164, 180, 181, 185, 171
  See application file for complete search history.

(56) References Cited

U.S. PATENT DOCUMENTS 5,238,757 A  *  8/1993  Suzuki et al. ................... 429/94
  2003/0118903 A1 * 6/2003  Ogaku ......................... 429/181

FOREIGN PATENT DOCUMENTS

| CN | 1428878 A | | 7/2003 |
| JP | 2002-93455 | * | 3/2002 |
| JP | 2002-231216 | * | 8/2002 |

OTHER PUBLICATIONS

Chinese Office Action dated Jul. 25, 2008, issued in corresponding Chinese Patent Application No. 200510075411.8.

* cited by examiner

*Primary Examiner* — Dah-Wei Yuan
*Assistant Examiner* — Angela J. Martin
(74) *Attorney, Agent, or Firm* — Westerman, Hattori, Daniels & Adrian, LLP (57) ABSTRACT

The present invention aims to provide a sealed battery having superior performance due to favorable welding of a terminal of a seal cover and a current collector body provided below the seal cover, and a manufacturing method for the sealed battery. In the sealed battery, one of a positive-electrode plate and a negative-electrode plate is electrically connected, via a current collector body, to a terminal of a seal cover which seals an outer can. The current collector body is a single-piece plate member that has a main body and a tab extending from the main body. The tab passes through an insulating ring and bends back such that part of the insulating ring lies between a tip of the tab and the main body of the current collector body. The main body is resistance welded to the electrode assembly, and the bent back tab is resistance welded to the terminal.

6 Claims, 6 Drawing Sheets

PRIOR ART

Prior Art

FIG.6

SEALED BATTERY AND MANUFACTURING METHOD THEREFOR

BACKGROUND OF THE INVENTION (1) Field of the Invention

The present invention relates to sealed storage batteries such as Nickel Cadmium (Ni—Cd) storage batteries, and manufacturing methods therefor.

(2) Description of the Related Art

Sealed batteries are widely used as driving power supply sources in power tools, electric bicycles, electric motorbikes, and so on. Representative of sealed batteries are alkaline secondary batteries such as Nickel Cadmium (Ni—Cd) batteries and Nickel Metal Hydride (Ni-MH) storage batteries, nonaqueous secondary batteries such as lithium ion batteries, and primary batteries. When put to such use, a battery is required at times to have good charge and discharge properties under conditions such as large current, and therefore it is necessary to reduce the internal resistance in the battery as much as possible and provide a stable current path.

However, a typical manufacturing method for a sealed battery (see Japanese Laid-Open Patent Applications 2002-93455 and H10-79243) is performed in the following manner in the case of a cylindrical battery. First, a power generating element (electrode assembly) is made by winding a positive-electrode plate and a negative-electrode plate together with a separator therebetween. Then power collecting bodies, each having a circular main body, are positioned on the electrode of each polarity, facing each other so as to cover the top and bottom ends of the electrode assembly, and this arrangement is packaged in a tube-shaped metal outer can. The positive-electrode current collector body is connected to a seal cover that is at an opening end terminal (positive terminal) of the outer can, and the negative-electrode current collector body is connected to the bottom (negative terminal) of the outer can. Next, after injecting an electrolyte into the metal outer can, resistance welding electrodes are applied to the battery from the top and bottom directions, and an instantaneous, large current is applied, thereby simultaneously resistance welding the positive-electrode plate of the electrode assembly and a rectangular tab extending from the positive-electrode current collector body with the terminal provided on the seal cover, and the negative-electrode plate of the electrode assembly with the outer can. Note that this resistance welding method is referred to as a "direct welding method" hereinafter. The seal cover is then fitted so as cover a opening in the outer can, and subject to caulking or the like, so as to seal the outer can, thereby completing the sealed battery.

Japanese Laid-Open Patent Application 2002-231216 discloses a technique for improving the shape of the positive-electrode current collector body in order to perform the welding effectively in a state where the seal cover is placed over the opening of the outer can, and to reduce the resistance value of the current path by shortening the length of the tab.

Figure 6:
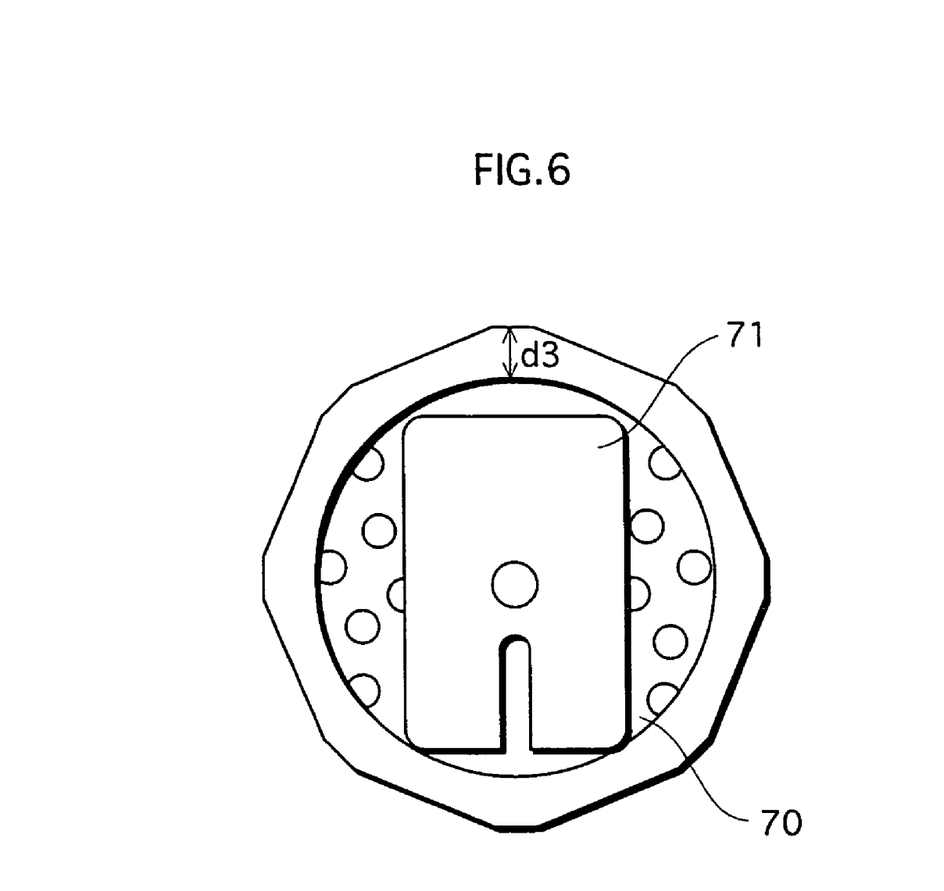
FIG. 6 shows the shape of a conventional insulating ring.

Here, in the outer can, an insulating member called an insulating ring, as shown in the elevation view in FIG. 6, is arranged on top of the electrode assembly so that the positive-electrode current collector body fits within the area of the ring. The insulating ring is provided, among other purposes, to position the electrode assembly inside the outer can, to prevent shorts between the outer can and the positive-electrode current collector body, and to prevent the electrolyte leaking.

However, the following problem occurs in a conventional battery with the described structure.

The tab of a conventional positive-electrode current collector body is fitted inside the insulating ring by being bent back toward the main body of the current collector body. This can result in the tip of the bent tab being in direct contact with the main body.

However, the existence of this part where the tab and the main body are in contact means that there is a risk that the load current value of the resistance welding will be inconsistent (so-called "leakage current" occurs) when using the aforementioned direct-welding method in manufacturing, and, consequently, that the resistance welding will not be able to be performed reliably.

If resistance welding is not carried out satisfactorily every time, the welding strength will be different for each battery. This leads to inconsistency in performance between batteries.

For this reason, prevention of unnecessary contact between the tab and the main body of the positive-electrode power conducting body as a result of resistance welding remains an issue.

Note that the same kind of problem also potentially occurs when the terminal of the seal cover is negative and the seal cover is connected to the negative-electrode current collector body.

SUMMARY OF THE INVENTION

The present invention was conceived in view of the described problems, and has an object of providing a sealed battery having superior performance due to favorable welding of a terminal of a seal cover and a current collector body provided below the seal cover, and a method for manufacturing the sealed battery.

The stated object is fulfilled by a sealed battery having an electrode assembly which is composed of a positive-electrode plate and a negative-electrode plate wound together with a separator therebetween and housed in an outer can, one of the positive- and negative-electrode plates being electrically connected, via a current collector body, to a terminal of a seal cover, and the outer can being sealed closed by the seal cover, wherein the current collector body is a single-piece plate member that has a main body and a tab extending from the main body, the tab passing through an insulating ring and bending back such that part of the insulating ring lies between a tip of the tab and the main body of the current collector body, and the main body is resistance welded to the electrode assembly, and the bent back tab is resistance welded to the terminal.

In the sealed battery of the present invention, part of the insulating ring lies between the tab and the main body, and therefore the insulation ring functions to prevent contact between the current collector body and the outer can. The tip of the tab lies on a second ring portion that is a wide part of the insulation ring. This prevents the tip of the tab from contacting the main body.

This structure prevents formation of an unstable current path caused by contact between the tip of the tab and the main body of the current collector body during resistance welding, and therefore enables the battery to be manufactured with favorable resistance welding. In addition, this structure suppresses rise in internal resistance caused by the current path and provides sealed batteries with stable performance.

Furthermore, when the present invention is applied to a cylindrical battery, the described structure can be realized by providing a wide ring portion and a narrow ring portion that oppose each other, and having the tip of the tab lie on the wide ring portion (the second ring portion).

The opening of the insulating ring is formed in a fan-shape and the second ring portion is provided in an area that corresponds to the spokes of the fan. This structure enables the tab to be rotated with respect to the insulating ring to a certain extent even if the tab is inserted through the ring diagonally, and therefore avoids unnecessary contact between the tab and the main body. Accordingly, battery assembly can be performed highly efficiently, and favorable sealed batteries can be manufactured.

Note that the insulating ring is formed from a sheet member, and therefore can be obtained by a relatively simple punching procedure. In other words the insulating ring can be fabricated at lower cost than with other methods such as an injection molding method.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

First Embodiment 1-1. Construction of Alkaline Storage Battery

Figure 1:
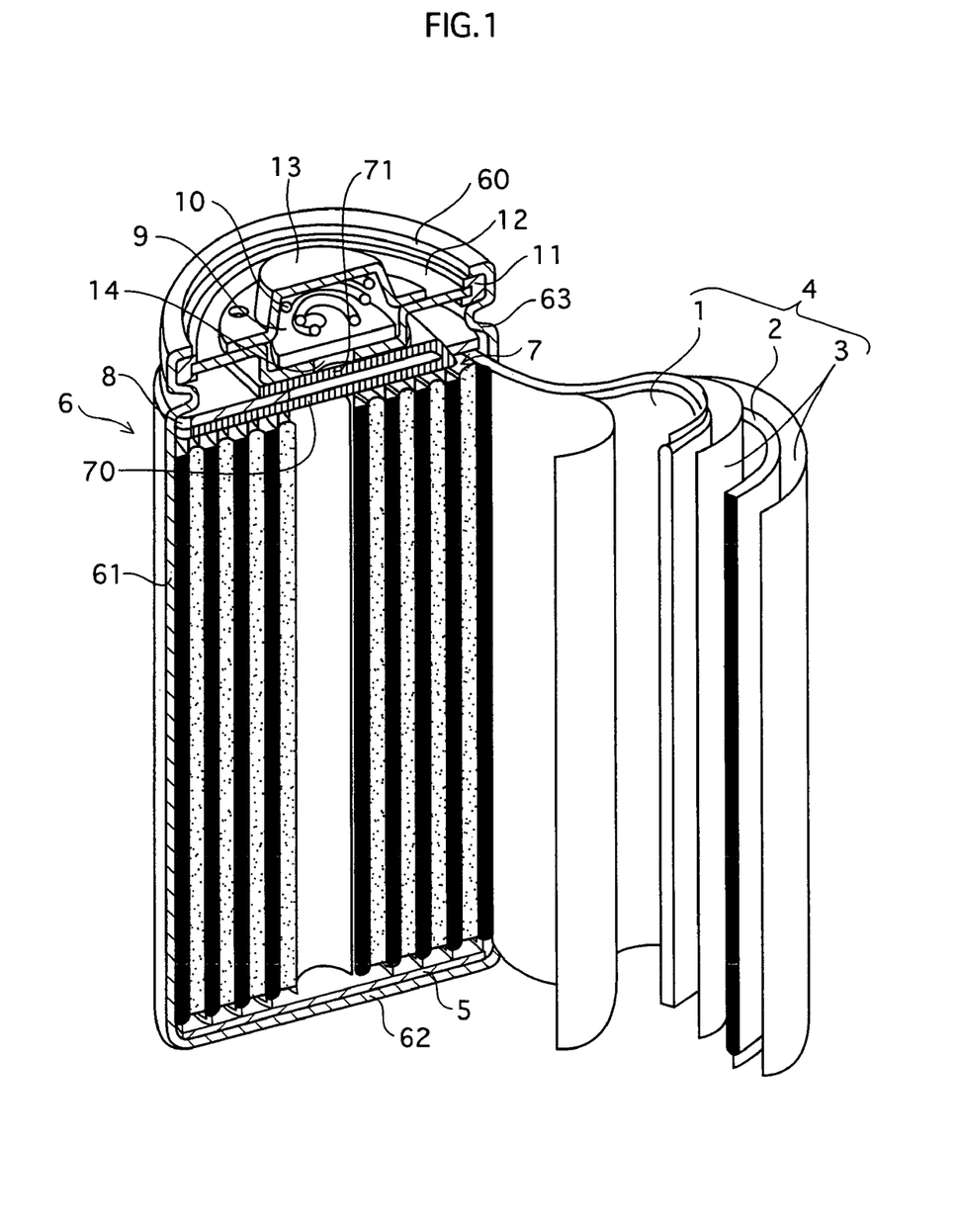
FIG. 1 is a cross sectional perspective drawing of a cylindrical alkaline storage battery of a first embodiment.

FIG. 1 is a sectional perspective view of a cylindrical nickel-cadmium (Ni—Cd) storage battery of the present invention.

The storage battery includes a cylindrical outer can 6 of SC size in which an electrode assembly 4, electrolyte, and the like are housed. The nominal capacity may be 2400 mAh for example. Alkaline solution is used as the electrolyte. In the present embodiment, a potassium-hydroxide-based solution is used as one example.

The cylindrical outer can 6 is made by forming Ni-coated Fe into a cylinder with a bottom. Other materials such as a stainless material and aluminium may be used depending on the type and characteristics of the battery. A side surface 61 of the cylindrical outer can 6 is coated with a resin film or a material for isolating the can from outside. An opening 60, which is an upper portion in FIG. 1, of the cylindrical outer package 6 is fitted with an insulation/sealing gasket 11 and a seal cover 12 and then caulked so that the cylindrical outer can 6 is hermetically closed. A grooving 63 is formed as a result of the caulking.

The electrode assembly 4 is made by winding a positive-electrode plate 1 and a negative-electrode plate 2 together with a separator 3 therebetween.

The positive-electrode plate 1 is, for example, a sintered nickel positive-electrode plate which is made by forming a nickel sintering porous material on a surface of a punching metal and then filling the nickel sintering porous material with a nickel-hydroxide-based active material by a chemical impregnation method. The positive-electrode plate 1 is resistance welded to a positive-electrode current collector body 7 and electrically connected to a positive-electrode terminal 13 via and the seal cover 12. The positive-electrode current collector body 7 is obtained by punch machining and is composed of a disc-shaped main body 70 and a rectangular tab 71.

The negative-electrode plate 2 is, for example, a sintered cadmium negative-electrode plate which is made by, as is the case with the positive-electrode plate 1, forming nickel sintering porous material on a surface of a punching metal and then filling the nickel sintering porous material with a cadmium-hydroxide-based active material by a chemical impregnation method. The negative-electrode plate 2 is connected to the bottom 62, which functions as a negative-electrode terminal, of the cylindrical outer can 6 via the negative-electrode current collector body 5 that is a porous disk made of Fe coated with Ni.

The separator 3 is constructed from a micro-porous film having excellent insulation property, such as nylon or polypropylene. The separator 3 is well impregnated with the electrolyte and is used to electrically insulate the positive-electrode plate 1 and the negative-electrode plate 2 from each other.

The positive-electrode current collector body 7 and the negative-electrode current collector body 5 are constructed from a material having excellent conductivity such as a nickel-plated metal plate. The positive-electrode current collector body 7 is designed so that the length of the rectangular tab 71 is shorter than the diameter of the main body 70. The purpose of this is not only to shorten the current path of the tab 71, but also to ensure that resistance welding (so-called direct welding) during manufacturing can be carried out efficiently with the seal cover 12 placed on the tab 71.

Note that the positive-electrode current collector body 7 is inserted through the insulating ring 8, and the insulating ring 8 is positioned so as to cover the top part of the electrode assembly 4.

The rim of the seal cover 12 is surrounded by the insulation/sealing gasket 11. The seal cover 12 has an opening (gas vent) 14 at a center thereof. The opening 14 is covered with a hat-shaped positive-electrode terminal 13.

In a space between the seal cover 12 and the positive-electrode terminal 13, a valve plate 9 and a coil spring 10 are provided in the stated order from bottom to top. The valve plate 9 on the opening 14 is pressed by the elastic force of the coil spring 10 downward toward the outside, allowing it to act as a safety value. An elastomer such as rubber may be provided instead of the valve plate 9 and the coil spring 10.

The construction of the sealed battery of the present first embodiment is characterized by the insulation ring 8 through which the positive-electrode current collector body 7 is inserted. In other words, the insulating ring 8 is designed so as to lie between the tip of the bent tab 71 the main body 70, thereby preventing the tip of the tab 71 from contacting the main body 70.

The following described the construction and merits of the insulating ring 8.

1-2. Construction and Merits of the Insulating Ring

Figure 2:
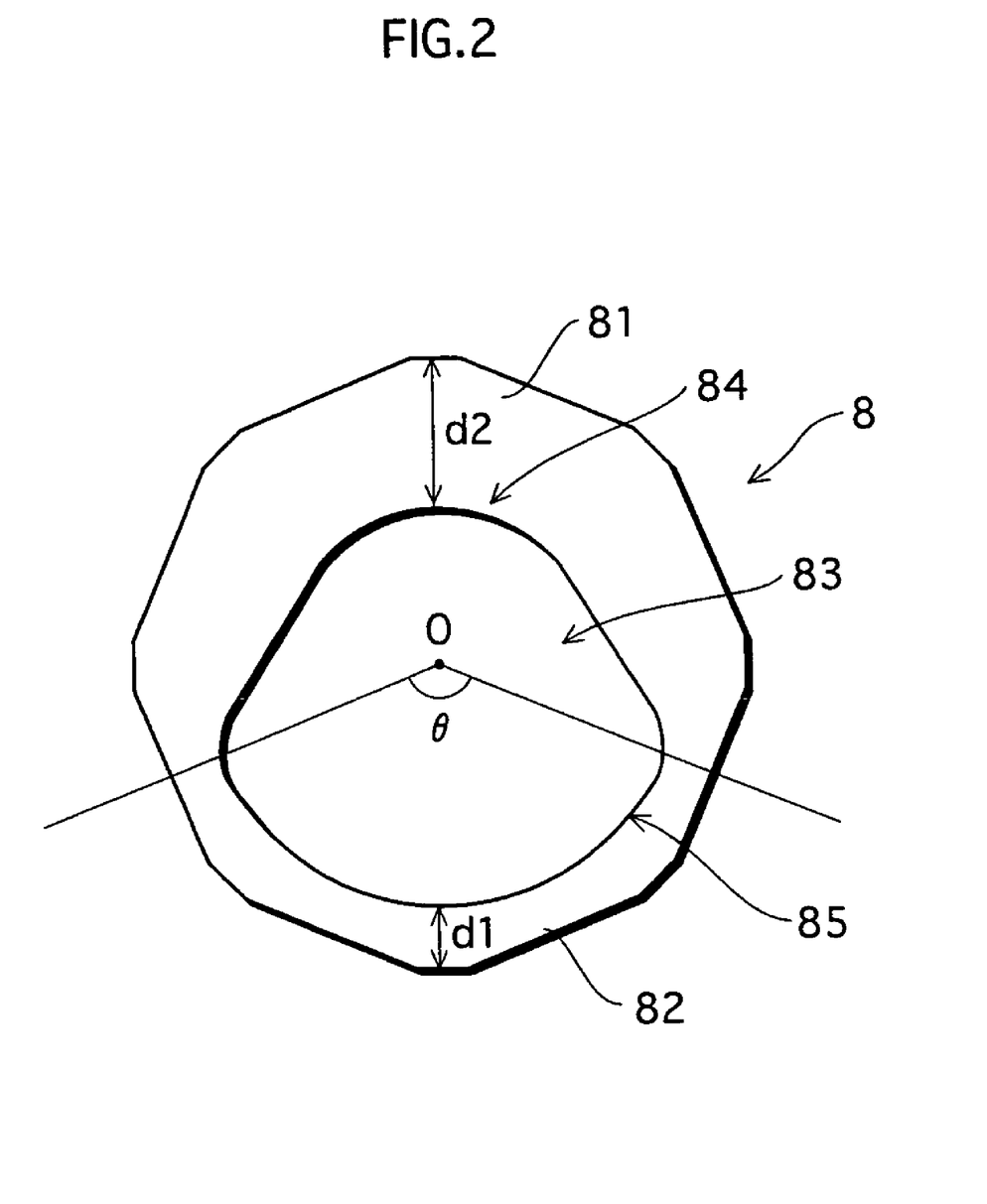
FIG. 2 is an elevation view of the construction of a insulating ring.

FIG. 2 is an elevation view of the construction of the insulating ring 8. The insulating ring 8 is also known as a positive-electrode washer or an anti-vibration ring, and is provided, among other purposes, to prevent vibration and displacement of the electrode assembly 4 in the outer can 6, and to prevent shorts between the outer can 6 and the positive electrode plate 1 of the electrode assembly 4. The insulating ring 8 is punched out from a resin plate that is made of alkaline-resistant insulating material such as polyethylene (PE), polypropylene (PP), or nylon. More specifically, the resin plate is punched so as to be substantially a disc-shape with a middle portion removed, and to be polygonal in shape. The reason that the circumference is polygonal is to ensure gaps between the insulating ring 8 and the outer can 6 when the insulating ring 8 is housed in the outer can 6, in order to facilitate smooth injection of the electrolyte and venting of the gas.

A fan-shaped opening 83 is formed in the inner part of the insulating ring 8 by machining. Here, the width d2 from a spoke portion 84 to the outer circumference is designed to be wider than a width d1 from an arc part 85 to the outer circumference. This results in a first ring portion 82 whose width d1 is relatively narrow, and a second ring portion 81 that has a width d2 and is closer than the first ring portion 82 to the ring center O.

Here, it is preferable that the range of the arc part 85 of the fan-shaped opening 83 is designed so as to provide some amount of freedom in the angle at which the tab 71 is inserted through the opening 83, and so as to ensure that the second ring portion 81 is a suitable shape that allows the tip of the inserted tab 71 to rest on the insulating ring 8.

In other words, making the fan-shaped opening 83 of the insulating ring 8 excessively large will have the advantage of enabling reduction in materials and weight, providing a relatively large internal space, and enabling the electrolyte to be injected more easily, but will cause a problem of the tab 71 contacting the main body 70. On the other hand, making the fan-shaped opening 83 of the insulating ring 8 excessively small will have the advantage of preventing the tab 71 and the main body 70 contacting each other, but will not enable the aforementioned advantages. The wider the width of the tab 71, the lower electrical resistance. Since it is preferable for the internal resistance of a battery to be relatively low, d2 of the insulating ring 8 and the angle of the arc part 85 are determined in conjunction with the width of the tab 71.

More specifically, in the example in the present embodiment, the width of the tab 71 is 10 mm, the maximum outer diameter of the insulating ring 8 is 21 mm, and d2 is 5 mm. Supposing a tangent on both the left and right sides of the fan-shaped opening 83 in FIG. 2, the point at which the tangents intersect is the uppermost part in FIG. 2 of the insulation ring 8. The shape of the opening 83 is set so that the angle at which the tangents intersect is 60±10°.

Figure 3A:
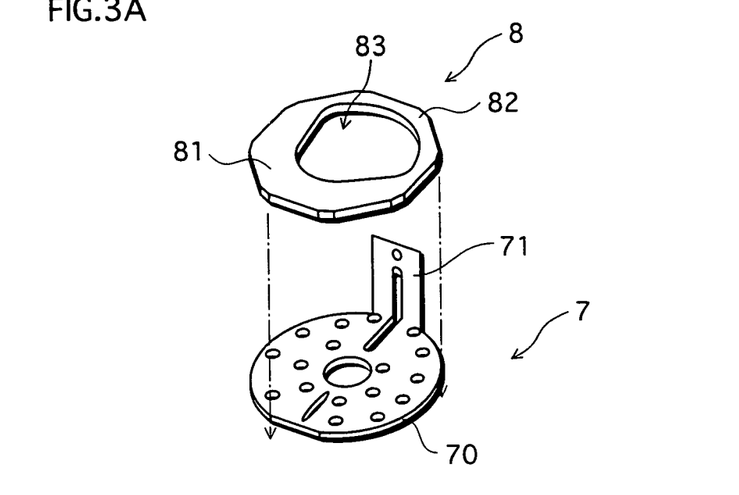
FIGS. 3A to 3C are assembly drawings of a positive-electrode current collector body and the insulating ring.

When manufacturing the sealed battery, the insulating ring 8 having this construction is positioned such that the first ring portion 82 is proximate to the base of the tab 71 (the bent part of the positive-electrode current collector body 7). Next, as shown in FIG. 3A, the tab 71 of the positive-electrode current collector body 7 is raised with respect to the main body 70, and is passed through the insulating ring 8 in a proximity of the first ring portion 82. The tab 71 is then bent back towards the main body 70 of the tab 71.

Figure 5A:
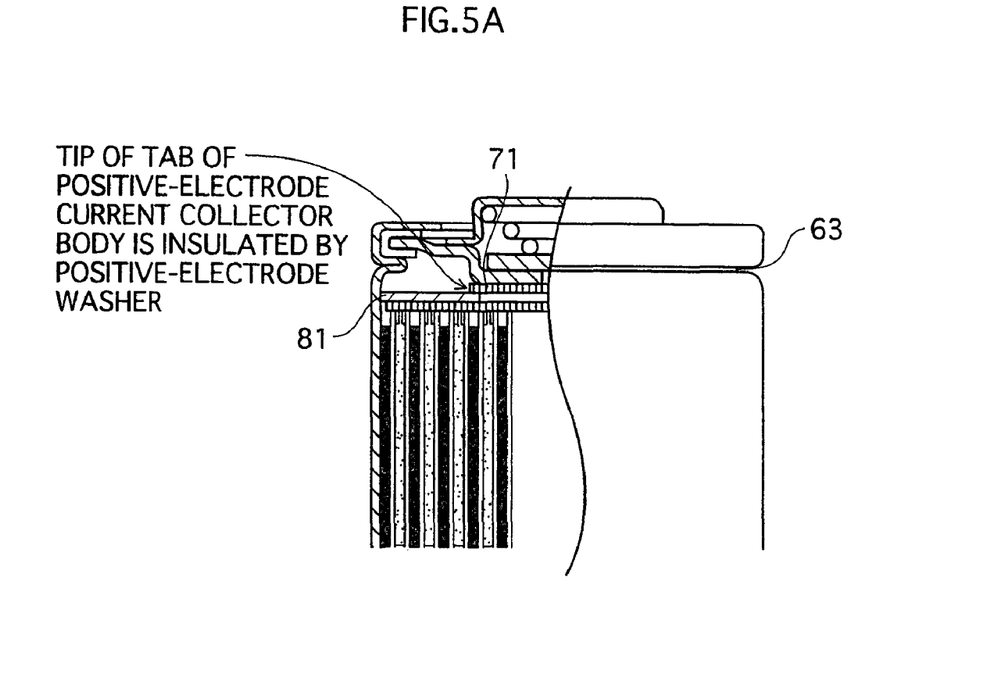
FIGS. 5A and 5B are exploded cross sectional views showing the structure the positive-electrode current collector body and the area therearound.
Figure 5B:
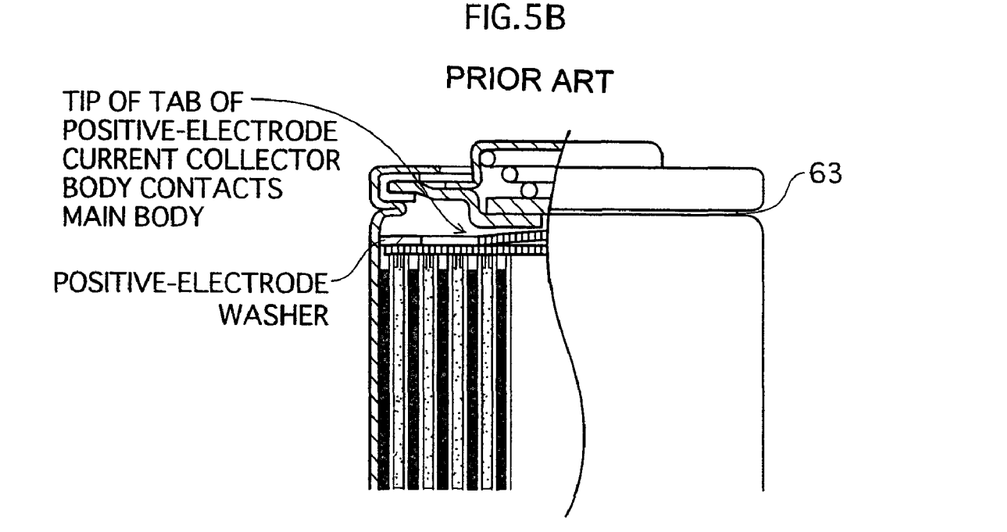

This results in the tip of the tab 71 being positioned on the insulating ring 8 with respect to the second ring portion 81 which has the wide part d2, and prevents the tip of the tab 71 contacting the main body 70 when direct resistance welding is carried out. In other words, in a conventional insulation ring, as shown in FIG. 6, in which a round opening or the like is provided, the bent tab 71 directly opposes the main body 70, therefore risking formation of an unstable contact portion between the two when direct resistance welding is carried out (see FIG. 5B). In contrast, in the present embodiment, such contact between the tab 71 of the current collector body 7 and the main body 70 is avoided due to the insulation ring 8 lying between the two (see FIG. 5A), and resistance welding is carried out with the tab 71 lying on an area A of the insulating ring 8. As a result, formation of an unstable current path (generation of leakage current) attributable to contact between the tip of the tab 71 and the main body 70 is avoided, and a resistance welding portion can be formed reliably. With this kind of favorable resistance welding portion, the battery exhibits stable output when used, and favorable battery performance can be expected.

Figure 3B:
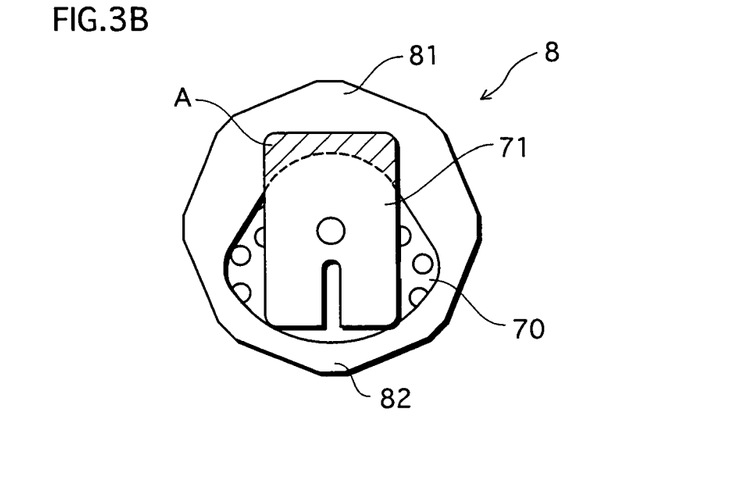
Figure 3C:
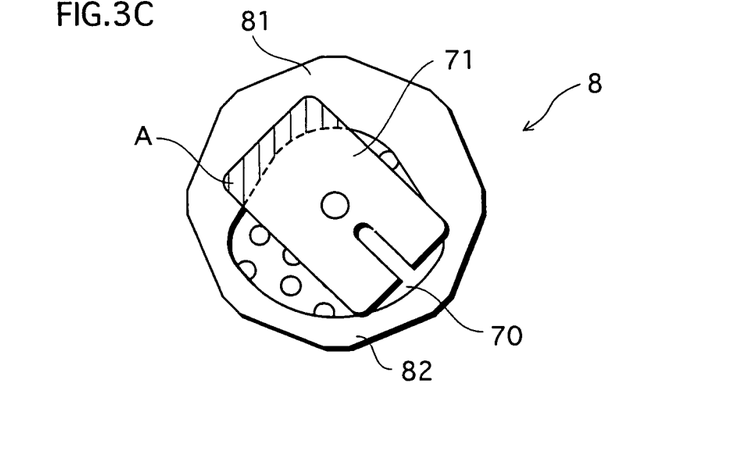

Furthermore, with the insulation ring 8 of the present embodiment, the arc part 85 is ensured to have a wide angle within the fan shaped hold 83, and therefore considerable flexibility is provided in terms of the angle at which the tab 71 is passed through the insulation ring 8. Specifically, as shown in FIG. 3C, since rotation flexibility is ensured even if the tab 71 is inserted through the insulation ring 8 somewhat diagonally, the area A is formed favorably, and unnecessary contact between the tab 71 and the main body 70 is avoided. For this reason, precise alignment of the tab 71 and the insulation ring 8 when assembling the battery is unnecessary. This means that assembly can be carried out highly efficiently, and favorable sealed batteries can be manufactured.

Since the insulation ring 8 of the present embodiment is able to be obtained through a relatively simple procedure of punching a plate member, it provides an advantage of being able to be fabricated at lower cost than if a method such as an injection molding was used. An example of a conventional insulation ring is one that has an upright flange portion on the edge of the circular main body (see Japanese Laid-Open Patent Application H8-264173 for details). An injection apparatus or the like it necessary to form this shape, but, in contrast, in the present invention the insulation ring can be formed without having to construct a special apparatus or manufacturing system, and therefore the present invention can be realized relatively easily. Note that the insulation ring 8 of the present embodiment may of course be fabricated using an injection molding method if this does not incur excessive problems in terms of cost.

While the example of the opening in the insulation ring 8 given in the present embodiment describes a fan-shaped opening. 83, any shape is possible as long as the bent part of the tab 71 is located further inwards than the inner edge of the insulating ring 8, and a part of the insulating ring 8 lies between the tab 71 of the positive-electrode current collector body 7 and the main body 70. In such a case, the opening should be of a shape that is sufficiently large to allow the tab 71 to be passed through in a position displaced with respect to a central point O of the insulation ring 8, and that a relatively wide area exists on which the tip of the tab 71 can be placed. Examples of shapes other than the fan shape include an oblong- or ellipse-shape that is horizontally long when seen from a main-surface direction of the insulating ring 8.

Although it is preferable that when the tab 71 of the positive-electrode current collector body 7 is rectangular, the insulation ring 8 of the present invention has a structure whereby the whole of the tip of the tab 71 can lie thereon, the advantages of the present invention can be satisfactorily obtained with a structure whereby at least part of the tab 71 lies on the insulation ring 8. However, in order to reliably prevent unnecessary contact between the tip of the tab 71 and the main body 70, ideally the whole of the tip of the tab 71 is separated from the main body 70 according to the area A as in the present embodiment.

Furthermore, while the insulating ring 8 may be partially cut out such that the opening connects in part to outside the insulating ring, it is preferable that the opening forms a complete loop without incisions in order to ensure a degree of material strength.

1-3. Method for Manufacturing the Sealed Battery

The following describes the overall flow of a procedure for manufacturing a battery in which the described insulation ring 8 is used.

The positive-electrode plate 1 and the negative-electrode plate 2 are wound together with the separator 3 therebetween to fabricate the electrode assembly 4.

The electrode assembly 4 and the negative-electrode current collector body 5 are housed in the outer can 6, and a predetermined electrolyte is injected into the outer can 6. Meanwhile, the insulation ring 8 is inserted onto the positive-electrode current collector body 7, and this arrangement is housed in the outer can 6 so as to lie on top of the electrode assembly 4. At this point, the tip of the tab 71 lies on the second ring part 81, which is the wide portion, of the insulation ring 8, as shown by A in FIG. 3B.

The seal cover 12 is then fitted onto the opening of the outer can 6.

Figure 4A:
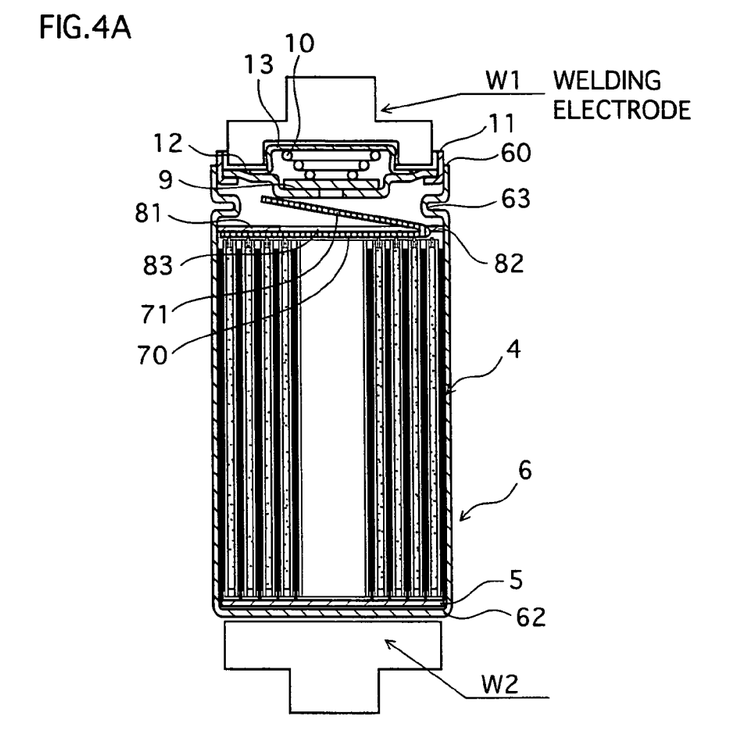
FIGS. 4A and 4B show a welding procedure and a caulking procedure performed during manufacturing.

Next, welding electrodes W1 and W2 are positioned at the top and bottom of the battery so as to press the seal cover 12 and the bottom 62 (see FIG. 4A), and direct resistance welding is performed. This results in integrated welding of the negative-electrode current collector body 5 to the negative-electrode plate of the electrode assembly 4 and the bottom 62, as well as the positive-electrode current collector body 7 to the positive-electrode plate of the electrode assembly 4 and the positive-electrode terminal of the seal cover 12. Note that resistance welding may be performed by spot welding the electrode assembly 4 with the power-collecting bodies 7 and 5 before the direct resistance welding.

Figure 4B:
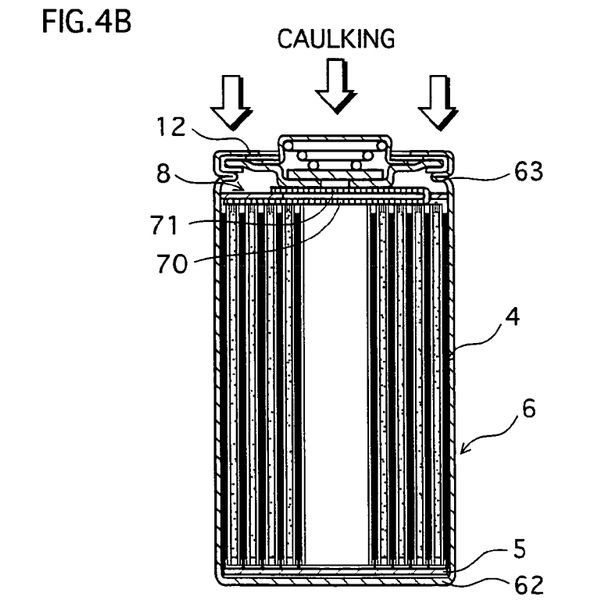

Next, the edge of the seal cover 12 is caulked so as to be sealed inside the battery (see FIG. 4B). Instead of caulking, the seal cover 12 may be sealed, for example, by laser sealing or the like.

This completes the sealed battery.

2. Implementation Example

Sealed batteries were fabricated as implementation examples of the present invention using the described manufacturing method, and subject to performance testing. The batteries were fabricated as SC size batteries with a capacity of 2500 mAh.

Comparison batteries were fabricated with a similar structure to the implementation example batteries, the difference being that conventional insulation rings as shown in FIG. 6 were used.

A plurality of these implementation example batteries and comparison batteries, respectively, were fabricated and investigated for variations in welding strength of the seal cover 12. More specifically, the resistance-welded seal covers 12 were subject to tensile testing, and their breaking strength measured. The greater the variation in the figures obtained according to these tests, the greater the variation in the strength of the resistance welding. In other words, a relatively large variation in the figures indicates unsatisfactory performance as a sealed battery.

The result of the tests are shown below. Note that "average value" in the table shows respective average measured values of the implementation example batteries and the comparison batteries, and expresses a range of variation of the measured values when the average value is "100%".

TABLE 1

| Battery | Variation in Welding Strength of Seal cover (average value 100) |
| --- | --- |
| Implementation Example Batteries | 90-110% |
| Comparison Batteries | 75-125% |

As shown by Table 1, the measured values for the implementation example batteries exhibit variations that are kept to within 10% above and below the average value, while the measured values for the comparison batteries exhibit variations scattered as much as 25% above and below the average value. This confirms that, in comparison with the comparison batteries, variations in strength are kept relatively low in the implementation example batteries. These results show improved welding strength in the implementation example batteries, but also more specifically, that in the implementation example batteries stable resistance welding is able to be carried out by avoiding unnecessary contact between the tab 71 of the current collector body 7 and the main body 70 during direct resistance welding due to the presence of the insulating ring 8.

3. Other Remarks

In the above embodiment, a structure is given that uses the electrode assembly 4 made by winding positive- and negative-electrode plates with a separator therebetween. However, as an alternative structure, the electrode assembly 4 may be composed of rectangular-shaped positive- and negative-electrode plates and separator may be used.

Furthermore, although a cylindrical battery is described in the above embodiment, the present invention may be applied to a sealed battery having a square or rectangular outer can. In such a case, however, the shape of the electrode assembly and the insulating ring must be adjusted according to the shape of the square or rectangular outer can, the electrode assembly being formed, for example, in a rectangular shape.

In terms of industrial use, the present invention may be applied to alkaline storage batteries that have a metal outer can, such as Nickel Metal Hydride batteries.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A sealed battery having an electrode assembly which is composed of a positive-electrode plate and a negative-electrode plate wound together with a separator therebetween and housed in an outer can, one of the positive- and negative-electrode plates being electrically connected, via a current collector body, to a terminal of a seal cover, and the outer can being sealed closed by the seal cover, wherein
   the current collector body is a single-piece plate member that is housed in the outer can and that has a main body and a tab extending from the main body, the tab passing through an insulating ring that has a fan-shaped opening and bending back such that part of the insulating ring lies between a tip of the tab and the main body of the current collector body, the tip of the tab being in contact with the part of the insulating ring, and
   the main body is resistance welded to the electrode assembly, and the bent back tab is resistance welded to the terminal.

2. The sealed battery of claim 1, wherein
the outer can is cylindrical,
the main body of the current collector body is circular and the tab of the current collector body is rectangular,
the insulating ring is formed by a middle portion being punched out of a sheet member, and is composed of a first ring portion and a second ring portion, a distance from a center point of the ring to an inner edge at the second ring portion being shorter than a distance from the center point to the inner edge at the first ring portion, and
with the tab passing through the insulating ring and bending back, the tip of the tab lies on the second ring portion.

3. The sealed battery of claim 2, wherein
the first ring portion is in an area that corresponds to an arc of the fan, and
the second ring portion is in an area that corresponds to spokes of the fan.

4. The sealed battery of claim 1, wherein an outer circumference of the main body is polygonal.

5. A manufacturing method for a sealed battery which is composed of a positive-electrode plate and a negative-electrode plate wound together with a separator therebetween and housed in an outer can, one of the positive- and negative-electrode plates being electrically connected, via a current collector body, to a terminal of a seal cover, the method comprising the steps of:

an insertion step of inserting a tab of the current collector body through an insulating ring, the current collector body being a single-piece plate member that has a main body and the tab extending from the main body;
an electrode assembly welding step of resistance welding the electrode assembly to the main body; and
a tab welding step of, with the tab bending back toward the main body and with the insulating ring insulating the tab and the main body from each other, resistance welding the tab to the terminal, such that the tab is in contact with the part of the insulating ring.

6. The manufacturing method of claim 5, wherein
the outer can is cylindrical,
the main body of the current collector body is circular and the tab of the current collector body is rectangular,
the insulating ring is made from a sheet member, and has a first ring portion that encompasses a portion of a periphery of a main surface of the insulating ring, and a second ring portion that is wider than the first ring portion, and
in the tab welding step, or in both the tab welding step and the electrode assembly welding step, the tab is inserted through the insulating ring and bent back such that the tab lies on the second ring portion, and welding electrodes are put into contact with a bottom of the outer can and a top part of the sealing cap, respectively.

* * * * *